United States Patent
Wiitala et al.

(10) Patent No.: US 9,836,437 B2
(45) Date of Patent: Dec. 5, 2017

(54) SCREENCASTING FOR MULTI-SCREEN APPLICATIONS

(71) Applicant: Google Inc., Mountain View, CA (US)

(72) Inventors: Yuri James Wiitala, Kirkland, WA (US); Hin-Chung Lam, Kirkland, WA (US); Jiao Yang Lin, Kirkland, WA (US); Mark Foltz, Seattle, WA (US); Nicholas Carter, Seattle, WA (US); Mark David Scott, Kirkland, WA (US)

(73) Assignee: GOOGLE LLC, Mountain View, CA (US)

( * ) Notice: Subject to any disclaimer, the term of this patent is extended or adjusted under 35 U.S.C. 154(b) by 226 days.

(21) Appl. No.: 13/843,693

(22) Filed: Mar. 15, 2013

(65) Prior Publication Data

US 2014/0281896 A1    Sep. 18, 2014

(51) Int. Cl.
*G06F 17/22* (2006.01)
*G06F 3/14* (2006.01)

(52) U.S. Cl.
CPC ........ *G06F 17/2247* (2013.01); *G06F 3/1454* (2013.01); *G09G 2340/0407* (2013.01); *G09G 2340/0464* (2013.01); *G09G 2340/145* (2013.01); *G09G 2370/00* (2013.01)

(58) Field of Classification Search
None
See application file for complete search history.

(56) References Cited

U.S. PATENT DOCUMENTS

| | | | | |
|---|---|---|---|---|
| 6,560,637 | B1 * | 5/2003 | Dunlap | G06F 17/30873 707/E17.111 |
| 6,594,773 | B1 * | 7/2003 | Lisitsa | H04N 21/4143 375/E7.271 |
| 7,346,698 | B2 * | 3/2008 | Hannaway | H04N 21/23406 348/14.07 |
| 8,166,390 | B2 * | 4/2012 | Fortes | G06F 17/211 715/238 |
| 8,436,786 | B2 * | 5/2013 | Kamoto | G06F 3/1446 345/1.1 |
| 8,798,598 | B2 * | 8/2014 | Rossmann | H04W 4/00 455/414.2 |
| 8,850,045 | B2 * | 9/2014 | Berg | H04L 63/08 709/225 |
| 9,141,645 | B2 * | 9/2015 | Lambourne | G11B 27/00 |

(Continued)

FOREIGN PATENT DOCUMENTS

| | | |
|---|---|---|
| JP | 2011-141615 A | 7/2011 |
| WO | 2014/149492 A1 | 9/2014 |

OTHER PUBLICATIONS

International Search Report and Written Opinion for PCT Patent Application No. PCT/US2014/018979, dated May 20, 2014, 13 pages.

(Continued)

*Primary Examiner* — Andrew Dyer
(74) *Attorney, Agent, or Firm* — Brake Hughes Bellermann LLP

(57) ABSTRACT

A method includes determining, by a local computing device, a portion of a web page to render for display via a remote display of a remote device, generating rendered presentation information by rendering the portion of the web page based upon at least one characteristic of the remote device and transmitting the rendered presentation information to the remote device.

15 Claims, 5 Drawing Sheets

(56) References Cited

U.S. PATENT DOCUMENTS

| | | | |
|---|---|---|---|
| 9,207,905 B2* | 12/2015 | Millington | |
| 9,344,471 B2* | 5/2016 | Lee | H04N 21/2353 |
| 9,472,939 B1* | 10/2016 | Hart | H02G 11/00 |
| 2002/0180727 A1* | 12/2002 | Guckenberger | G06T 11/60 345/418 |
| 2003/0229900 A1* | 12/2003 | Reisman | G06F 17/30873 725/87 |
| 2004/0024809 A1* | 2/2004 | Edwards | H04L 67/16 709/203 |
| 2004/0055018 A1* | 3/2004 | Stone | H04N 5/44582 725/113 |
| 2005/0039133 A1* | 2/2005 | Wells | G06Q 10/10 715/740 |
| 2005/0168630 A1* | 8/2005 | Yamada | H04N 5/0736 348/383 |
| 2005/0174482 A1* | 8/2005 | Yamada | H04N 9/12 348/383 |
| 2005/0207728 A1* | 9/2005 | Nishitani | H04N 9/3147 386/230 |
| 2005/0235334 A1* | 10/2005 | Togashi | H04L 12/2807 725/117 |
| 2006/0079214 A1* | 4/2006 | Mertama | H04M 1/7253 455/414.1 |
| 2006/0093044 A1* | 5/2006 | Grantham | G06F 3/1446 375/240.28 |
| 2006/0203758 A1* | 9/2006 | Tee | H04W 88/04 370/315 |
| 2008/0091772 A1 | 4/2008 | Kasik et al. | |
| 2008/0177825 A1 | 7/2008 | Dubinko et al. | |
| 2008/0214239 A1 | 9/2008 | Hashimoto et al. | |
| 2010/0169778 A1* | 7/2010 | Mundy | G06F 17/30905 715/716 |
| 2012/0054616 A1* | 3/2012 | Mittal | G06F 17/30899 715/722 |
| 2013/0089302 A1* | 4/2013 | Barnea | H04N 21/23412 386/278 |
| 2014/0019891 A1* | 1/2014 | Borah | G06F 8/30 715/762 |
| 2014/0053054 A1* | 2/2014 | Shen et al. | 715/234 |
| 2014/0126714 A1* | 5/2014 | Sayko | 379/265.09 |

OTHER PUBLICATIONS

International Preliminary Report on Patentability from PCT/US2014/018979 dated Sep. 24, 2015, 11 pages.

Office Action from EP14712410.1, dated Sep. 20, 2016, 6 pages.

* cited by examiner

300

SCREENCASTING FOR MULTI-SCREEN APPLICATIONS

TECHNICAL FIELD

This description relates to displaying images or content, and more specifically to displaying on a remote display an image generated by a local computing device.

BACKGROUND

Traditionally remote desktop implementations operate as client/server computing environments. The controlling computer (referred to in this context as the client) displays a copy of the image received from the controlled computer's (in this context the server) display screen. The copy is generally updated on a timed interval, or when a change on screen is noticed by the remote control software. The software on the controlling computer transmits its own keyboard and mouse activity to the controlled computer, where the remote control software implements these actions. The controlled computer then behaves as if the actions were performed directly at that computer. In many cases the local display and input devices can be disabled so that the remote session cannot be viewed or interfered with.

SUMMARY

According to one general aspect, a method may include determining, by a processor of a local computing device, a portion of a web page to render for display via a remote display of a remote device. The method may also include generating rendered presentation information by rendering the portion of the web page based upon at least one characteristic of the remote device. The method may include transmitting the rendered presentation information to the remote device.

According to another general aspect, an apparatus may include a processor and a network interface. The processor may be configured to determine a portion of a web page to render for display via a remote display of a remote device, and generate rendered presentation information by rendering the portion of the web page based upon at least one characteristic of the remote device. The network interface may be configured to transmit the rendered presentation information to the remote device.

According to another general aspect, a tangibly embodied computer-readable medium may include executable code of a machine-executable program which, when executed, may be configured to cause an apparatus to determine, by a processor of the apparatus, a portion of a web page to render for presentation via a remote presentation hardware component of a remote apparatus, generate rendered presentation information by rendering the portion of the web page based upon at least one characteristic of the remote apparatus, and transmit the rendered presentation information to the remote apparatus.

The details of one or more implementations are set forth in the accompanying drawings and the description below. Other features will be apparent from the description and drawings, and from the claims.

A system and/or method for displaying information, substantially as shown in and/or described in connection with at least one of the figures, as set forth more completely in the claims.

BRIEF DESCRIPTION OF THE DRAWINGS

Like reference symbols in the various drawings indicate like elements.

DETAILED DESCRIPTION

Figure 1:
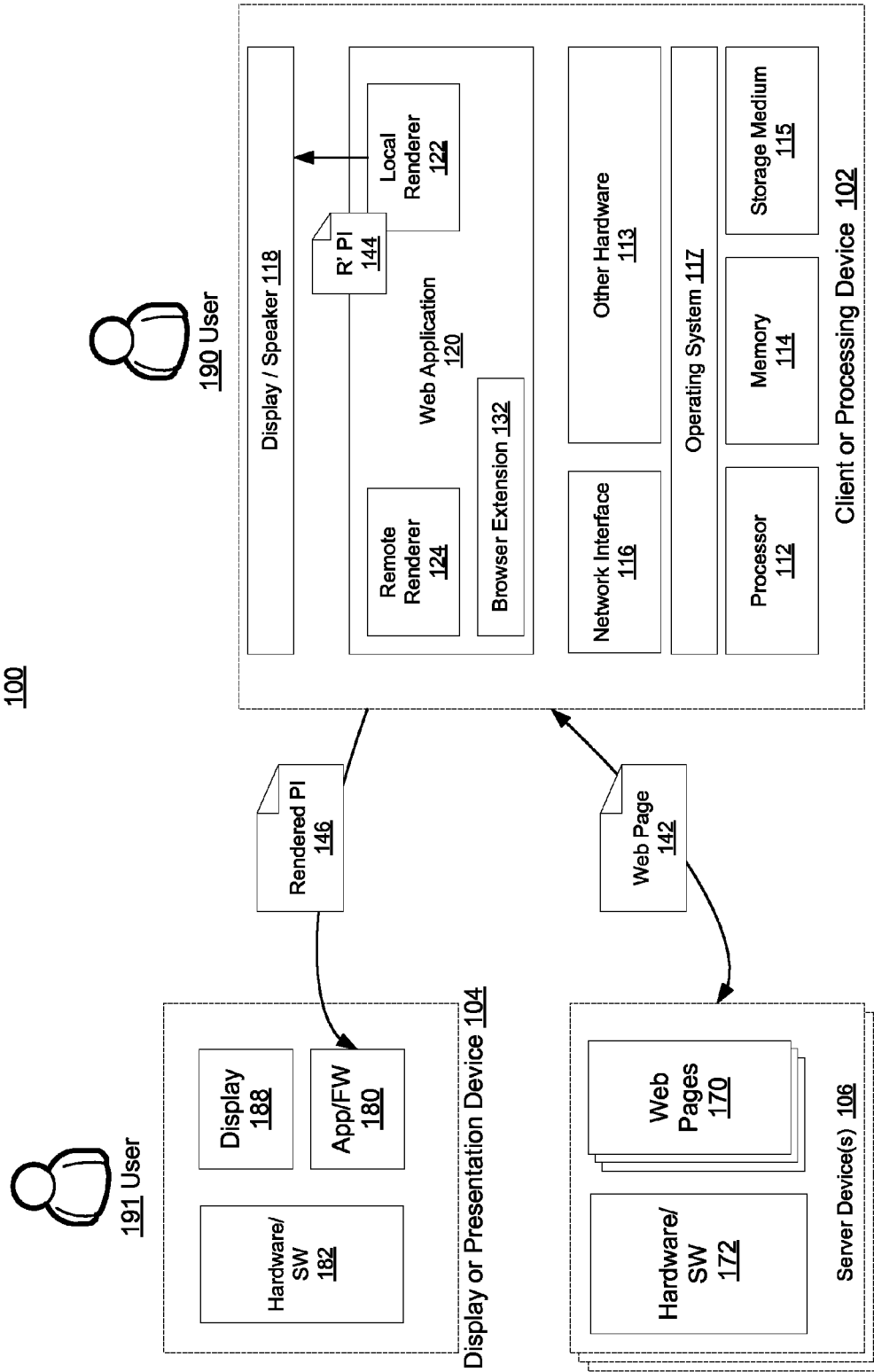
FIG. 1 is a block diagram of an example embodiment of a system in accordance with the disclosed subject matter.

FIG. 1 is a block diagram of an example embodiment of a system 100 in accordance with the disclosed subject matter. In one embodiment, the system 100 may include a computing device 102 which is used or operated by a user 190. In some embodiments, the system 100 may also include a display device 104 configured to display or present one or more audio and/or visual signals or pieces of information. In yet another embodiment, the system 100 may include one or more server devices 106 configured to provide one or more web pages 170.

In various embodiments, the client or processing device 102 may include a computing device, such as, for example, a laptop, desktop, workstation, personal digital assistant, smartphone, tablet, and other appropriate computers, etc. or a virtual machine or virtual computing device thereof. In such an embodiment, the processing device 102 may include sufficient computing resources (e.g., processing power, memory, etc.) to generate presentation information for display by the display device 104.

In such an embodiment, the processing device 102 may be configured to take a web page 142 or other raw set of information and use that information to generate the presentation information needed to present the information to a user 191 and/or user 190. This presentation information 146 may then be communicated to the display device 104, where it is presented to the user 191.

In this context, the term "presentation" and its various word-forms (e.g., "present", "presenting", etc.) may include outputting information to a user (e.g., user 191, etc.) via at least one hardware component associated with a form of sensory perception (e.g., liquid crystal display (LCD), headphones, haptic hardware, etc.). For example, in one embodiment, presenting information to a user may simply include displaying a video signal or visual information to a user. In another embodiment, presenting may include both displaying a video signal or visual information and playing an audio signal via a loudspeaker to a user. In yet another embodiment, in which the output hardware of the display or presenting device includes haptic hardware (e.g., rumble controller, haptic touchscreen, etc.) presenting may include controlling the haptic hardware in accordance with a signal or information associated with such a haptic device. It is understood that the above are merely a few illustrative examples to which the disclosed subject matter is not limited.

In various embodiments herein the term "display" may be used for illustrative purposes when discussing the disclosed subject matter, it is understood that such is merely illustrative and that the disclosed subject matter is not limited to only the visual presentation of information.

In various embodiments, the computing device 102 may include a processor 112 configured to execute one or more machine executable instructions or pieces of software, firmware, or a combination thereof. The computing device 102 may include, in some embodiments, a memory 114 configured to store on or more pieces of data, either temporarily, permanently, semi-permanently, or a combination thereof. Further, the memory 114 may include volatile memory, non-volatile memory or a combination thereof. In various embodiments, the computing device 102 may include a storage medium 115 configured to store data in a semi-permanent or substantially permanent form. In various embodiments, the storage medium 115 may be included by the memory 114. In some embodiments, the computing device 102 may include one or more network interfaces 116 configured to associate with and communicate via one or more communication networks (e.g., a wired network, a wireless network, a cellular network, etc.). In some embodiments, the computing device 102 may include an human output device (HOD) 118 such as a monitor, display, loudspeaker, headphones, etc. via which the computing device 102 may present information to the user 190. In various embodiments, the computing device 102 may include one or more other hardware components 113 (e.g., a keyboard, a touchscreen, a camera, a fingerprint reader, a video processor, etc.).

In various embodiments, the computing device 102 may include an operating system (OS) 117 configured to provide one or more services to an application 120 and manage or act as an intermediary between the applications (e.g., application 120, etc.) and the various hardware components (e.g., the processor 112, the network interface 116, etc.) of the computing device 102.

In such an embodiment, the computing device 102 may include one or more native applications (e.g., application 120, etc.), which may be installed locally (e.g., within the storage medium 115, etc.) and configured to be executed directly by the processor 112 and directly interact with the OS 117. In such an embodiment, the native applications may include pre-compiled machine executable code. In some embodiments, the native applications may include a script interpreter (e.g., C shell (csh), AppleScript, AutoHotKey, etc.) or a virtual machine (e.g., the Java Virtual Machine, the Microsoft Common Language Runtime, etc.) that are configured to translate source or object code into executable code which is then executed by the processor 112.

In some embodiments, the computing device 102 may include a web browser 120 configured to access a web site or a collection of web pages, scripts, etc. from a physically remote server or web server (e.g., server 106, etc.). In some embodiments, the web browser 120 may be included as one of the native applications or as a portion of the operating system 117.

In various embodiments, the web application 120 may be configured to display several documents or web pages at once in a graphical user interface (GUI). In the area of GUIs, a tabbed document interface (TDI) or multiple document interface (MDI) allows multiple documents to be contained within a single window. Often tabs can be used as containers to provide different content (e.g., documents, web pages, etc.) to a user 190 within a single window of an application, and to allow the user to easily switch between viewing and interacting with the different content in the different tabs. TDI's and MDI's are interface styles most commonly included with web browsers, web applications, text editors and preference panes.

In various embodiments, the web browser 120 may include or be configured to interact with one or more browser extensions 132. In this context, a "browser extension 132" may include one or more web pages (e.g., web page 142, etc.) packaged or grouped together as a definable whole, and configured to add functionality to the web browser 120. In one embodiment, a browser extension 132 may add functionality by altering the way a web page 142 or web site is displayed or rendered by the web browser 120 (e.g., by blocking advertisements, adding hyperlinks, etc.). In the illustrated embodiment, the browser extension 132 may add functionality to the web application 120 by communicating with the display or presentation device 104. In another embodiment, the browser extension 132 may allow or reconfigure a rendering engine of the web browser 120, as described below. In yet another embodiment, the web application 120 may include one or more of the capabilities described herein and may not include such a browser extension 132. It is understood that the above are merely a few illustrative examples to which the disclosed subject matter is not limited.

In this context, a "web page" includes a file or document which is a portion of a web site. In various embodiments, such web pages may include a file formatted as Hypertext Markup Language (HTML), Cascading Style Sheets (CSS), JavaScript, Extensible Markup Language (XML) such as a XHTML (Extensible HyperText Markup Language) file, an Adobe Flash file, images, videos, etc. In various embodiments, the web browser 120 may process one or more web pages in order to render one web page. For example, an HTML web page may be modified by or include other web pages, such as, JavaScripts, a CSS file, various images, etc. It is understood that the above is merely one illustrative example to which the disclosed subject matter is not limited.

In this context, a "web site" may include a collection or grouping of related web pages that are generally viewable or understandable (once rendered by the web browser 120) to the user 190 (or user 191, etc.). In various embodiments, when a web site (e.g., the web pages 170) is accessed via a communications network, the web site may be accessed via the Hypertext Transfer Protocol (HTTP) or Hypertext Transfer Protocol Secure (HTTPS). It is understood that the above is merely one illustrative example to which the disclosed subject matter is not limited.

In the illustrated embodiment, the web application 120 may be configured to access a web page 142 from one or more server devices 106. In some embodiments, the web page 142 may be stored locally by the processing device 102. In another embodiment, the web page 142 may be generated by another application (e.g., a video game, etc.).

In various embodiments, the server device 106 may include a computing device, such as, for example, a laptop, desktop, workstation, personal digital assistant, smartphone, tablet, and other appropriate computers, etc. or a virtual machine or virtual computing device thereof. In such an embodiment, the server device 106 may include various hardware and software components 172 similar and/or analogous to the hardware components described above in relation to the client device 102 (e.g., processor, memory, operating system, etc.). In the illustrated embodiment, the server device 106 may be configured to provide one or more web pages 142 upon request (e.g., from the web application 120 or other application, etc.) to the client device 102. In various embodiments, the web page 142 may be dynamically generated by the server device 106 or one of a plurality of static web pages 170, or a combination thereof.

In the illustrated embodiment, when the web application 120 receives the web page 142 (from the server device 106 or other source), the web application 120 (or component thereof, such as the browser extension 132) may determine if any portion of the web page 142 is to be presented remotely (e.g., via the presentation device 104). In some embodiments, the entire web page 142 may be presented remotely (with respect to the processing device 102).

In one embodiment, the web page 142 (or portion thereof) may be presented locally (e.g., via the display 118). In such an embodiment, the user 190 may indicate (e.g., via a user interface (UI) element) that a portion or component of the web page (e.g., a video, an image, an audio signal, etc.) is to be displayed remotely. In some embodiments, this may result in the indicated portion being presented both locally and remotely. In another embodiment, the local presentation of the indicated portion of the web page 142 may be stopped and a remote presentation of the portion may be started or initiated. It is understood that the above are merely a few illustrative examples to which the disclosed subject matter is not limited.

In another embodiment, the web page 142 itself or another web page that associated with the web page 142 may include an indication that the web page 142 or a portion thereof is to be presented remotely. In one embodiment, this indication may occur via an HTML tag or attribute (e.g., an "target" attribute, etc.). In another embodiment, the indication may occur via a programmatic function such as a script (e.g., JavaScript, etc.) call (e.g., the window.open( ) method or subroutine or a derivative thereof, etc.). In such an embodiment, a new script method or subroutine may be created based upon an existing script method or subroutine. Such a new method or subroutine may include additional parameters (e.g., display type, destination presentation device identifier or address, etc.). In yet another embodiment, the indication may occur via an application programming interface (API) configured to facilitate the creation and use of multi-monitor or remote presentation web pages or applications. It is understood that the above are merely a few illustrative examples to which the disclosed subject matter is not limited.

In various embodiments, the portion of the web page 142 may include an entire tab or window of the web application 120 and any other web pages associated with that tab or window. In some embodiments, the portion of the web page 142 may include a hidden or non-visible tab of the web application. In such an embodiment, the hidden tab may not be visible locally by the user 190 but may be controllable by the user 190 via an associated non-hidden or visible tab or via a UI element of the browser extension 132 or web application 120. It is understood that the above are merely a few illustrative examples to which the disclosed subject matter is not limited.

In another embodiment, the web page 142 may include one or more Document Object Model (DOM) elements or analogous hierarchical or separable elements. In some embodiments, the portion of the web page 142 may include a DOM element or the DOM element and its children or subordinate DOM elements. It is understood that the above are merely a few illustrative examples to which the disclosed subject matter is not limited.

While, in various embodiments, the web page 142 may be presented locally, remotely, in-part-remotely, and/or in-part locally, the reminder of the description of FIG. 1 will discuss the case in which the web page 142 is presented both locally and remotely, as that allows both the mechanics of the local presentation and the mechanics of the remote presentation to be explained and contrasted. It is understood that the below is merely one illustrative example to which the disclosed subject matter is not limited.

In the illustrated embodiment, the web application 120 may determine that the web page 142 is to be presented both locally and remotely (via presentation device 104). In one embodiment, the web page 142 may include a video or movie that is to be displayed on a processing tablet or other device 102 and displayed on television or other presentation device 104. It is understood that the above is merely one illustrative example to which the disclosed subject matter is not limited.

In various embodiments, the display or presentation device 104 may include a computing device, such as, for example, a laptop, desktop, workstation, personal digital assistant, smartphone, tablet, a television, a projector, loud speakers, and other appropriate device configured to present information to a user via a form of sensory perception, etc. or a virtual machine or virtual computing device thereof. In such an embodiment, the presentation device 104 may or may not include various hardware and software components 182 similar and/or analogous to the hardware components described above in relation to the client device 102 (e.g., processor, memory, operating system, etc.).

In the illustrated embodiment, the web application 120 may include a local render or rendering engine 122. In various embodiments, this local renderer 122 may be configured to take as input a web page 142 or other form of machine and/or human readable data and generate a set of presentation information 144 as output. In such an embodiment, the rendered presentation information 144 may include one or more data structures or signals (e.g., a video signal, an audio signal, etc.) that may be received by a display, loud speaker or other presentation hardware component 118 (or a driver or firmware thereof). The display 118 may then use this presentation information 144 to present the sensory output to the user 190.

In one embodiment, the set of presentation information 144 may include a series of arrays of Red-Green-Blue (RGB) values, where each RGB value is the color a pixel of the display 118 is to produce at a given point in time, and where each array includes color information for each pixel of the display 118 for a given point in time. In another embodiment, the set of presentation information 144 may include a series of values where each value equals a volume amplitude that is to be produced or output by a speaker at a given point in time. In some embodiments, the set of presentation information 144 may include encoded values that when decoded (e.g., by a driver, operating system, or firmware, etc.) result in such an array of color values, volume amplitudes, similar instructions to a presentation hardware component 118 or 188. In various embodiments, other sensory forms may be included by the set of presentation information 144 or other sets of presentation information.

In the illustrated embodiment, the local renderer 122 may be configured to take the information or data included by the web page 142 (e.g., text information, font information, encoded video stream, encoded audio file, etc.) and convert or translate that information into the presentation information 144. In various embodiments, this may include decompressing a video or audio file. In another embodiment, this may include transcoding a video or audio file. In another embodiment, this may include employing a graphics libraries (e.g., Skia Graphics Engine, OpenGL (Open Graphics Library), Cairo, etc.) to perform a layout and painting of the document or web page 142.

In various embodiments, this rendering may be performed based upon one or more constraints associated with the ultimate presentation device 118. For example, the local display 118 may have presentation characteristics, such as, for example, a resolution of 1600×1200 pixels, an aspect ratio of 4:3, a color depth of 32 pits per pixel, etc. In such an embodiment, the rendering of the web page 142 may be performed with these presentation characteristics in mind. For example, a video (e.g., a Digital Video Disc (DVD) movie file, etc.) with a native or original aspect ratio of 16:9 may be letterboxed by the renderer. A video with a native or original resolution of 720×405 pixels may be upscaled by the renderer 122 to take advantage of the higher presentation resolution. Conversely, if the local speakers 118 are only stereo, and the original audio source includes a 6 (a.k.a. 5.1) channel audio signal, the renderer 122 may re-mix or reduce the original audio signal to stereo. It is understood that the above are merely a few illustrative examples to which the disclosed subject matter is not limited.

Once the local renderer 122 has generated the rendered presentation information 144, based at least in part upon the physical or presentation characteristics of the target (in this case local) presentation hardware 118, the presentation information 144 may be transmitted or input to the local presentation hardware 118. In various embodiments, the local presentation hardware 118 may then present the rendered web page 142 (via the presentation information 144) to the user 190. In some embodiments, the presentation to the user 190 may be synchronized with other remote presentation devices 104.

Conversely, in the illustrated embodiment, the web application 120 may include a remote renderer or rendering engine 124. In various embodiments, this remote renderer 124 may be configured to take as input a web page 142 or other form of machine and/or human readable data and generate a set of presentation information 146 as output. In such an embodiment, the rendered presentation information 146 may, like the local presentation information 144, include one or more data structures or signals (e.g., a video signal, an audio signal, etc.) that may be received by a display, loud speaker or other presentation hardware component 188 (or a driver or firmware thereof). The display 188 may then use this presentation information 146 to present the sensory output to the user 191 of the presentation device 104.

In such an embodiment, the remote renderer 124 may generate the remote presentation information 146 based upon the web page 142 (or portion thereof) similarly to the local renderer 122. However, the remote renderer 124 may base its rendering or generation of the remote presentation information 146 upon one or more presentation characteristics of the remote presentation hardware 188.

For example, the original or source video movie file (e.g., a DVD file, etc.) may include a resolution of 720×405 pixels, an aspect ratio of 16:9, an frame rate of 25 frames per second (fps), and a 5.1 audio track or signal. However, this time the remote display and audio presentation hardware 188 may support or include the following set of presentation characteristics: a resolution of 1280×720 pixels, an aspect ratio of 16:9, a frame rate of 29.97 fps, and available 5.1 surround sound (a.k.a. 5 traditional speakers and a sub-woofer).

In such an embodiment, the remote renderer 124 may or may not upscale the video, and may not alter (aside from basic rendering) the audio portion (as both the original source video and presentation hardware support 5.1 audio channels). However, in various embodiments, as the remote renderer 124 may not add letterboxing as the aspect ratios of the original video or web page 142 is the same as the aspect ratio of the remote presentation hardware 188. This is compared to the local renderer 122 which rendered the video for a different presentation device 118 and did add letter-boxing. Likewise, the remote renderer 124 may be config-ured to re-sync the video file form the native or original 25 fps to the presentation device 188's supported 29.97 fps. It is understood that the above is merely one illustrative example to which the disclosed subject matter is not limited.

In various embodiments, other presentation characteristics or usage scenarios may be considered. For example, a laptop screen of display 118 is generally only a few feet from a user 190. Conversely, a user 191 of a television may sit dozens of feet from the display 188. In various embodiments, the remote and local renderers 122 and 124 may take these usage scenarios into account when rendering a web page 142. For example, the remote renderer 124 may make text larger (e.g., increase the font size, etc.) or clearer (e.g., change the font, change the displayed color, etc.) as it will be read from farther away than the local renderer 122 might (as the text will be read from a shorter distance). In various embodiments, other non-mathematical, non-numerical, or qualitative presentation characteristics may be considered or affect the generation of the presentation information 144 & 146. It is understood that the above is merely one illustrative example to which the disclosed subject matter is not limited.

As described above, once the remote renderer 124 has generated the rendered remote presentation information 146, the remote presentation information 146 may be transmitted to the presentation device 104. As described below in reference to FIG. 3, in various embodiments, the remote presentation information 146 may be formatted or encapsulated in a transmission protocol.

In various embodiments, the presentation device 104 may include an application, driver, or firmware 180 configured to receive the remote presentation information 146. In various embodiments, the application, driver, or firmware 180 may be configured to remove the encapsulation or formatting from the received remote presentation information 146 if it includes such formatting. In some embodiments, the application, driver, or firmware 180 may be configured to provide the remote presentation information 146 to the presentation hardware or display 188 for presentation to the user 191.

Figure 2:
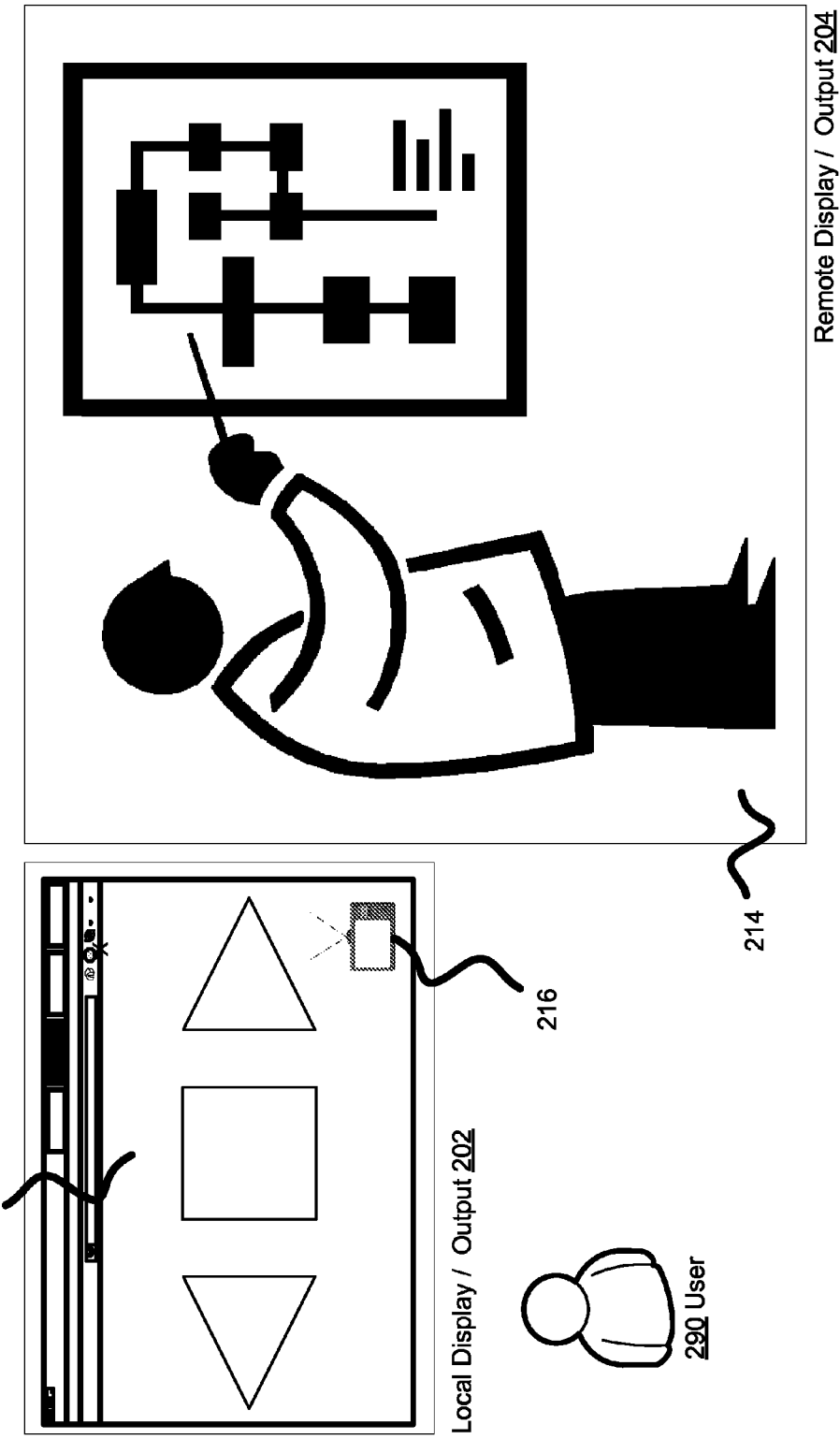
FIG. 2 is a block diagram of an example embodiment of a system in accordance with the disclosed subject matter.

FIG. 2 is a block diagram of an example embodiment of a system 200 in accordance with the disclosed subject matter. In the illustrated embodiment, the system 200 may include a local or processing device or display 202 and a remote or presentation display or device 204. In various embodiments, the system 200 may be controlled or managed by a user 290.

In the illustrated embodiment, the user 290 wishes to display a slideshow of images on a remote display 204 and control the slideshow from a local computing or processing device that includes the local display 202. In such an embodiment, a first portion 212 of a web page may be displayed on the local display 202 and second portion 214 of the web page may be displayed or presented on a remote display 204. In various embodiments, the second portion of the web page may include a plurality of other web pages (e.g., a plurality of image files, etc.). In some embodiments, the second portion of the web page may include a script that causes one image of a plurality of images of be displayed. It is understood that the above is merely one illustrative example to which the disclosed subject matter is not limited.

In one embodiment, the first portion 212 displayed or presented via the local display 202 may include a user interface (UI) to allow the user 290 to control the contents of the second portion 214. In the illustrated embodiment, the UI may include a back button, a stop button, and a forward button. Each button may allow the user 290 to cause the slideshow displayed on the remote display 204 to, respectively, move back one image, end the slide show, or move forward one image.

In various embodiments, once the user 290 has selected a UI button, a command may be generated by the first portion 212. This command may be received by the processing device and may cause an action to be performed by the second portion 214. For example, the first portion 212 may cause a script function, method or subroutine (e.g., NextImage( ), etc.) of the second portion 214 to be executed. This script function may change the part of the second portion 214 that is displayed or presented to a user. For example, the second portion 214 may cease displaying a first image and begin displaying a second image. In various embodiments, this may cause the second portion 214 to be re-rendered.

As described above, the remote renderer or rendering engine of the processing device may render the now changed second portion 214. The rendering engine may generate a new set of presentation information based upon this new version of the second portion 214 and the characteristics of the remote display 204. This new or updated presentation information may be transmitted to the remote display 204. When the remote display 204 presents this updated presentation information to the user 290, it may appear that the slideshow has moved to the next image.

In various embodiments, the processing device may update the presentation information and cause a remote display or presentation hardware 204 to dynamically alter the presentation to the user 290. In various embodiments, the remotely displayed or presented portion of the web page may be altered or updated based upon one or more commands received by the processing device. In the illustrated embodiment, the commands may come from the processing device itself (e.g., via the first portion 212, etc.). In another embodiment, the commands may originate or be transmitted from the remote device 204 (e.g., a command from a TV remote control transmitted via the television to the processing device, etc.). In yet another embodiment, the commands may originate or be transmitted from the third or other device (not shown).

For example, a multi-player game may include displaying controls or gamepads on various player devices (e.g., smartphones, etc.), displaying a centralized game board on a communally viewable television, and processing and rendering all of the displays via a processing device. In such an embodiment, the processing device may receive commands from each of the player devices and alter the displays or presentations of the game board and/or the player's gamepads. In such an embodiment, each of the player gamepads and the game board may include various portions of a game's web page. Further, in some embodiments, the processing device may maintain or include an additional portion of a web page (possibly a hidden tab or web page) to account for the game's rules and mechanics. It is understood that the above is merely one illustrative example to which the disclosed subject matter is not limited.

In the illustrated embodiment, the local display 216 or the first portion 212 may also include a UI element 216. In various embodiments, the UI element 216 may facilitate the selection of the portion 214 to be displayed or presented remotely and/or the selection of which of a plurality of remote presentation devices will be used to present or display the second portion 214. In various embodiments, selection of the UI element 216 may cause a menu or other UI element to be displayed. For example, in various embodiments, a list of possible target or presentation devices (both local and/or remote) may be displayed to the user 290 and the user 290 may select which one they wish to use to present the second portion 214. In another embodiment, the UI element 216 may be displayed next to a web page element (e.g., a video, an image, the web page element associated with an HTML Audio tag, a Flash object, etc.). In such an embodiment, selecting the UI element 216 may cause the web page element or portion of the web page that includes that web page element to be presented remotely (e.g., via a similar list of presentation devices, etc.). Likewise, a second selection of the UI element 216 may cause the web page portion to be presented locally. It is understood that the above are merely a few illustrative examples to which the disclosed subject matter is not limited.

Figure 3:
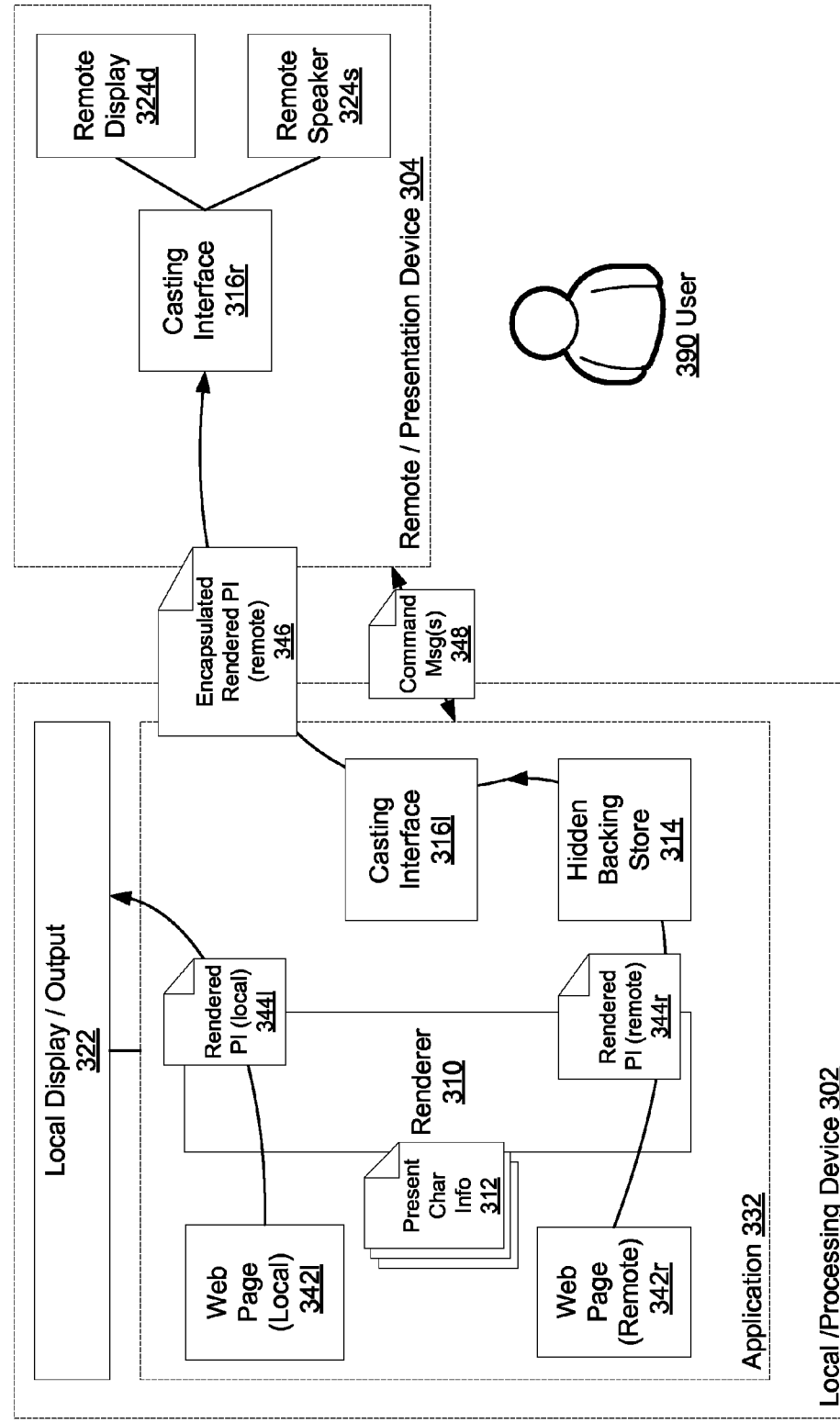
FIG. 3 is a block diagram of an example embodiment of a system in accordance with the disclosed subject matter.

FIG. 3 is a block diagram of an example embodiment of a system 300 in accordance with the disclosed subject matter. In various embodiments, the system 300 may include a local or processing device 302 and one or more remote or presentation devices 304. In various embodiments, the system 300 may be operated or used by a user 390. In one embodiment, the system 300 may be employed to create the system 200 of FIG. 2 in which a user displayed a slideshow on a remote device and displayed a control UI on a local device. It is understood that the above is merely one illustrative example to which the disclosed subject matter is not limited.

In various embodiments, the local or processing device 302 may include one or more hardware and/or software components (not shown) analogous or similar to the hardware and/or software components described in reference to the processing device 102 of FIG. 1 (e.g., processor, memory, operating system, etc.). Likewise, in one embodiment, the remote or presentation device 304 may include one or more hardware and/or software components (not shown) analogous or similar to the hardware and/or software components described in reference to the presentation device 104 of FIG. 1 (e.g., processor, memory, operating system, etc.).

As described above, the processing device 302 may include a web application 332 configured to render a web page (or at least one portion thereof) for presentation either locally or remotely. As described above, while, in various embodiments, the web page 342 may be presented locally, remotely, in-part-remotely, and/or in-part locally, the remainder of the description of FIG. 3 will discuss the case in which the web page 342 is presented both locally and remotely, as that allows both the mechanics of the local presentation and the mechanics of the remote presentation to be explained and contrasted. It is understood that the below is merely one illustrative example to which the disclosed subject matter is not limited.

In various embodiments, the web application 332 may include a renderer 310 configured to generate one or more sets of presentation information from a web page or portion thereof. In the illustrated embodiment, the web application 332 may include a single renderer 310 that may be configured or take as input presentation configuration information 312 associated with a respective presentation device or hardware (e.g., local display 322, remote display 324d, remote speaker 324s, etc.). In various embodiments, the web application 332 may include or be associated with a hidden backing store configured to store, at least temporarily, the rendered presentation information associated with a remote presentation device. In some embodiments, this hidden backing store 314 may be configured to be hidden or unknown to a graphics (or other sensory presentation) hardware component that is responsible for presenting information via the local display or output 322. In some embodiments, the web application may include a casting or transmission interface 316*l* configured to format or encapsulate the rendered presentation information 344*r* for transmission to a remote presentation device.

As described above, in one embodiment, the web page 342 may include locally presented portion 342*l*. This local portion 342*l* may be renderer by the renderer 310. In such an embodiment, the renderer 310 may load or make use of a set of presentation characteristics or information 312 associated with the local display 322. The renderer 310 may generate the local presentation information 344*l*, which is then displayed or presented by the local display 322.

Likewise, in one embodiment, the web page 342 may include a remotely presented portion 342*r*. This remote portion 342*r* may be renderer by the renderer 310. In such an embodiment, the renderer 310 may load or make use of a set of presentation characteristics or information 312 associated with the remote display 324*d* or remote speakers 324*s*.

In various embodiments, the renderer 310 may obtain or receive the presentation characteristics 312 associated with presentation hardware 324 from the remote device 304. In such an embodiment, upon being instructed to send the remote portion of the web page 342*r* to the presentation device 304 for display, the local device 302 may engaging in a request/response handshake or other protocol with the remote device 304 to confirm that the remote device 304 will accept the transmitted presentation information 346. In such an embodiment, during that handshake process the relevant set of presentation characteristic information 312 may be sent to the processing device 302.

In another embodiment, the presentation characteristic information 312 itself may not be sent to the processing device 302, but instead an identifier may be sent that allows the renderer to select a suitable set of presentation characteristics 312 from a plurality of pre-stored or obtainable sets of information 312. For example, the remote device 304 may provide the local device 302 with the remote device 304's model number or a standard identifier (e.g., High-definition television (HDTV) standard, such as, "1080p", etc.) with which the remote device is substantially compliant.

In yet another embodiment, the user 390 may have previously or during the initiation of the remote presentation request provided the local device 302 with enough information to identify a suitable set of presentation characteristics 312. For example, the user 390 may identify the remote device 304 by a class or type of device (e.g., "720p compliant television", etc.), by a specific model number or group of model numbers (e.g., an RCA television model 12345, etc.), or as compatible with one of a plurality of predefined sets of presentation characteristics (e.g., a "Generic 5.1 channel audio receiver", etc.). It is understood that the above are merely a few illustrative examples to which the disclosed subject matter is not limited.

As described above, in various embodiments, the renderer 310 may be configured to make use of the selected or determined set of presentation characteristics 312 associated with the specific remote presentation hardware (e.g., hardware 324*d* or 324*s*, etc.) to generate a rendered set of presentation information 344*r*. In various embodiments, in which the remote portion of the web page 342*r* includes elements or content that results in a plurality sensory presentations (e.g., video and audio, etc.) or is to be presented by multiple presentation devices (e.g., an LCD and a loud speaker, etc.), the renderer 310 may be configured to generate a plurality of sets of presentation information 344*r* (one for each presentation device). In such an embodiment, each set of presentation information 344*r* may be generated based upon a set of presentation characteristics 312 associated with each respective presentation hardware component. In another embodiment, the renderer 310 may make use of multiple associated sets of presentation characteristics 312 to generate a combined or common set of remote presentation information 344*r* that includes presentation for multiple hardware components (e.g., remote display 324*d* and remote speaker 324*s*, etc.). It is understood that the above are merely a few illustrative examples to which the disclosed subject matter is not limited.

In some embodiments, once the remote presentation information 344*r* has been generated, it may be stored (at least temporarily) within a hidden backing store 314. In various embodiments, the backing store 314 may be or may be included by a portion of memory. In some embodiments, this memory may be the general memory of the local device 302, whereas the local presentation information 344*l* may be stored within a specialized memory dedicated for the use of the local display 322 or similar presentation hardware (e.g., a memory of a graphics card, etc.). In various embodiments, by being separate from the memory used or employed by the local presentation hardware 322 the backing store 314 may be effectively hidden from the local presentation hardware 322. It is understood that the above is merely one illustrative example to which the disclosed subject matter is not limited.

In various embodiments, the remote presentation information 344*r* may be transmitted to the remote or presentation device 304 via the casting interface 316*l*. In various embodiments, the casting interface 316*l* may be configured to reformat or encapsulate the remote presentation information 344*r* according to a predefined transmission protocol. In some embodiments, the predefined transmission protocol may include a real-time communications protocol. In some embodiments, this may include the Web Real-Time Communication (WebRTC) or protocol substantially compliant with the WebRTC.

In another embodiment, the casting interface 316*l* may be configured to encode or compress the remote presentation information 344*r* according to a predefined format. In various embodiments, the predefined format may depend upon an encoding format supported by the receiving remote device 304. In various embodiments, a video compression format substantially compliant with the VP8 video compression format may be used or employed. In another embodiment, a video compression format substantially compliant with the H.264 video compression format may be used or employed. In yet another embodiment, other video compression formats (e.g., Opus, H.265, etc.) may be used or employed. Likewise, in various embodiments, various audio compression formats (e.g., MPEG-2 Audio Layer III (a.k.a. MP3), Advanced Audio Coding (AAC), etc.) may be employed. It is understood that the above are merely a few illustrative examples to which the disclosed subject matter is not limited.

In various embodiments, once processed by the casting interface 316*l*, the encapsulated or re-formatted presentation information 346 may be transmitted to the presentation device 304. In the illustrated embodiment, the presentation device 304 may include a casting interface 316*r*. In such an embodiment, the remote casting interface 316*r* may be configured to de-encapsulate, decode, or remove the formatting applied for transmission by the casting interface 316*l*. In various embodiments, once the presentation information 344*r* has been recovered from the encapsulated or reformatted presentation information 346, it may be passed to the respective remote display 324d or remote speaker 324s for presentation to the user 390.

As described above, in various embodiments, one or more messages or command messages 348 may be communicated between the processing device 302 and the presentation device 304. In one embodiment, these messages 348 may include the presentation configuration information 312 for the presentation device 304. In another embodiment, the messages 348 may indicate that a user 390 selected one or more UI elements displayed via the remote display 324d. In another embodiment, the messages 348 may indicate a hardware change on the remote device 304 (e.g., a set of headphones has been plugged in or removed, etc.). In yet another embodiment, the messages 348 may include synchronization or updating information. In various embodiments, the messages 348 may be unidirectional, bi-directional, or multi-directional. It is understood that the above are merely a few illustrative examples to which the disclosed subject matter is not limited.

Figure 4:
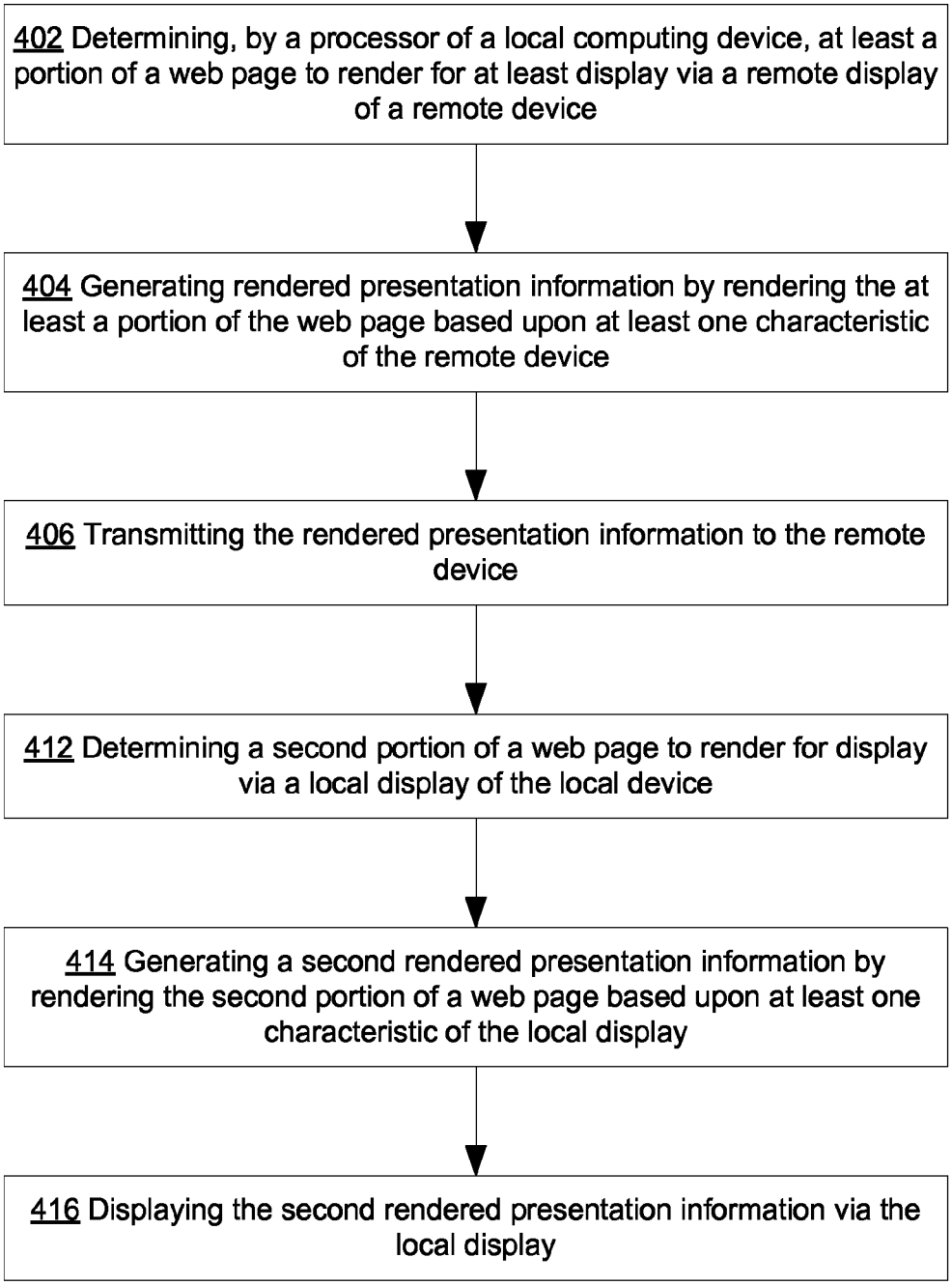
FIG. 4 is a flow chart of an example embodiment of a technique in accordance with the disclosed subject matter.

FIG. 4 is a flow chart of an example embodiment of a technique in accordance with the disclosed subject matter. In various embodiments, the technique 400 may be used or produced by the systems such as those of FIGS. 1, 3 and/or 5. Furthermore, portions of technique 400 may be used or produced by the system such as that of FIG. 2. Although, it is understood that the above are merely a few illustrative examples to which the disclosed subject matter is not limited. It is understood that the disclosed subject matter is not limited to the ordering of or number of actions illustrated by technique 400.

Block 402 illustrates that, in one embodiment, a portion of a web page to render for display via a remote display of a remote device may be determined, as described above. In some embodiments, user input may be received via the local computing device, as described above. In such an embodiment, determining the portion of the web page to render for display via the remote display may be based, at least in part, upon the user input, as described above. In various embodiments, one or more of the action(s) illustrated by this Block may be performed by the apparatuses or systems of FIG. 1 or 3, the web application 120 of FIG. 1, or the application 332 of FIG. 3, as described above.

Block 404 illustrates that, in one embodiment, rendered presentation information may be generated by rendering the portion of the web page based upon at least one characteristic of the remote device, as described above. In some embodiments, generating the rendered presentation information may include selecting a set of presentation characteristic information associated with the remote display, and rendering the portion of the web page based upon the set of presentation characteristic information associated with the remote display, as described above. In various embodiments, the portion of the web page to render for display may include an audio portion, and generating rendered presentation information may also include generating an audio signal based upon at least one characteristic of an audio component of the remote device, as described above. In such an embodiment, determining the portion of the web page to render for display via the remote display may be based, at least in part, upon the user input, as described above. In various embodiments, one or more of the action(s) illustrated by this Block may be performed by the apparatuses or systems of FIG. 1 or 3, the remote renderer 124 of FIG. 1, or the renderer 310 of FIG. 3, as described above.

Block 406 illustrates that, in one embodiment, the rendered presentation information may be transmitted to the remote device, as described above. In various embodiments, transmitting may include reformatting the rendered presentation information according to a real-time communications protocol, as described above. In some such embodiments, the real-time communications protocol may be substantially compliant with Web Real-Time Communication (WebRTC), as described above. In various embodiments, one or more of the action(s) illustrated by this Block may be performed by the apparatuses or systems of FIG. 1 or 3, the web application 120 of FIG. 1, as described above.

Block 412 illustrates that, in one embodiment, a second portion of the web page may be determined or identified to render for display via a local display of the local computing device, as described above. In some embodiments, the second portion of the web page to render for display via the local display may include the portion of the web page to render for at least display via the remote display, as described above. In various embodiments, one or more of the action(s) illustrated by this Block may be performed by the apparatuses or systems of FIG. 1 or 3, the web application 120 of FIG. 1, or the application 332 of FIG. 3, as described above.

Block 414 illustrates that, in one embodiment, a second rendered presentation information may be generated by rendering the second portion of the web page based upon at least one characteristic of the local display, as described above. In various embodiments, one or more of the action(s) illustrated by this Block may be performed by the apparatuses or systems of FIG. 1 or 3, the local renderer 122 of FIG. 1, or the renderer 310 of FIG. 3, as described above.

Block 416 illustrates that, in one embodiment, the second rendered presentation information may be displayed or presented via the local display, as described above. In various embodiments, one or more of the action(s) illustrated by this Block may be performed by the apparatuses or systems of FIG. 1 or 3, the web application 120 of FIG. 1, as described above.

Figure 5:
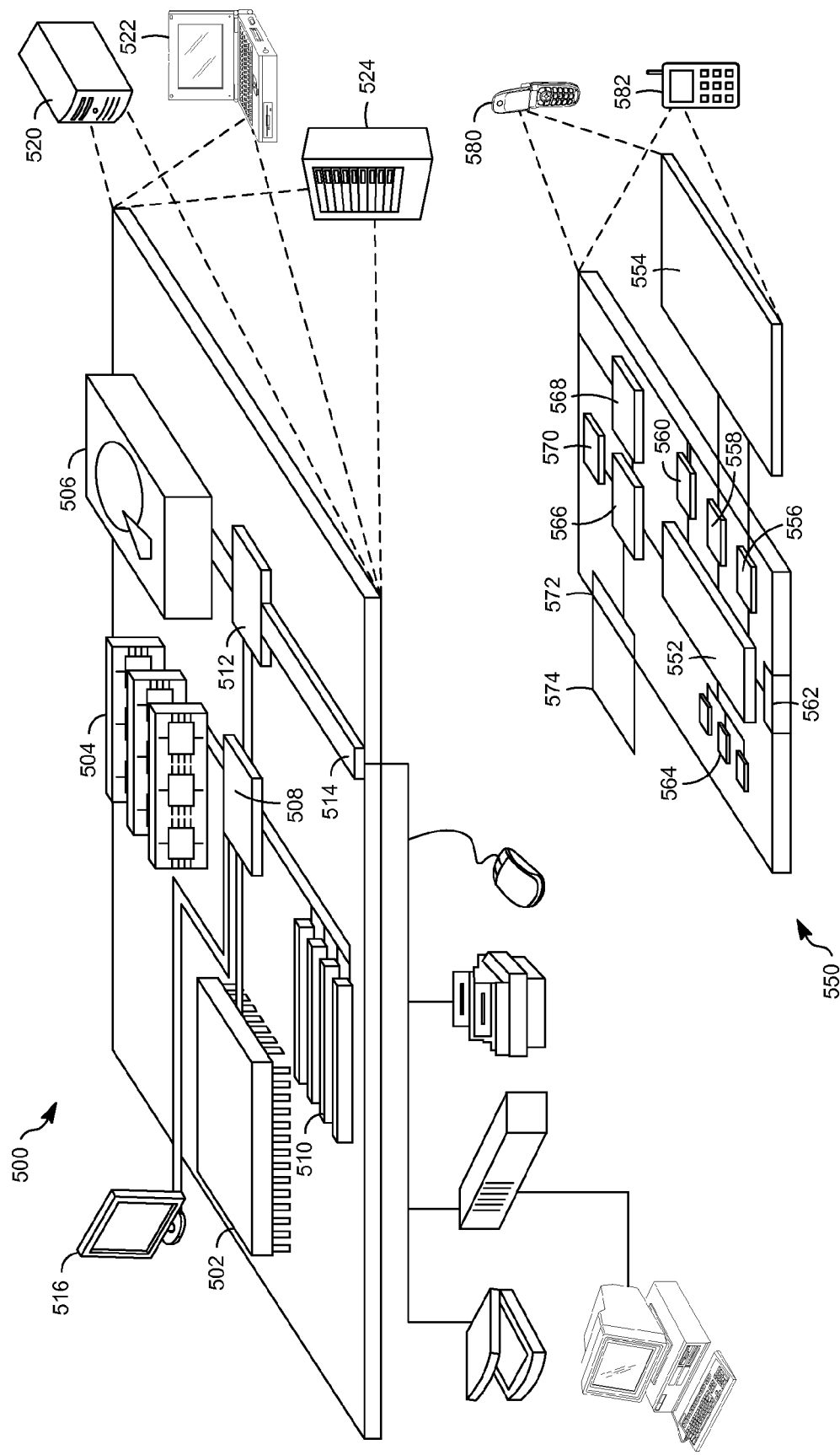
FIG. 5 shows an example of a computer device and a mobile computer device that can be used to implement the techniques described here.

FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provided as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552, that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method comprising:
   receiving at a local computing device a web page in response to a user of the local computing device requesting the web page, the local computing device including a first renderer and a second renderer;
   first rendering, by the first renderer, the web page on a display of the local computing device, wherein the rendering is based upon at least one first visual presentation characteristic of the display of the local device;
   receiving, at the local computing device, at least one second visual presentation characteristic of a display of a remote device, the at least one first visual presentation characteristic being different than the at least one second visual presentation characteristic;
   receiving an indication of an action by the user of the local computing device;
   in response to the action by the user of the local computing device, determining, by a processor of the local computing device, a portion of the web page to render for display via the display of the remote device;
   second rendering, by the second renderer, the portion of the web page, wherein
      the second rendering is based upon the received at least one second visual presentation characteristic of the display of the remote device,
      the portion of the web page is visually the same on the display of the local device and the display of the remote device, and
      the second rendering is synchronized with the first rendering to display the second rendering on the display of the remote device at a same time as the first rendering is displayed on the display of the local computing device;
   generating, by the processor of the local computing device, rendered presentation information based upon the second rendering; and
   transmitting, by the processor of the local computing device, the rendered presentation information and the second rendered portion of the web page from the local device to the remote device.

2. The method of claim 1, wherein transmitting includes:
   reformatting the rendered presentation information according to a real-time communications protocol.

3. The method of claim 2, wherein the real-time communications protocol is compliant with Web Real-Time Communication (WebRTC).

4. The method of claim 1, wherein the portion of the web page to render for display includes an audio portion; and wherein generating rendered presentation information includes generating an audio signal based upon at least one characteristic of an audio component of the remote device.

5. The method of claim 1, further comprising:
determining a second portion of the web page to render for display on a local display of the local computing device;
generating a second rendered presentation information based upon rendering the second portion of the web page based upon at least one characteristic of the local display; and
displaying the second rendered presentation information on the local display.

6. The method of claim 5, wherein the second portion of the web page to render for display via the local display includes the portion of the web page to render for at least display via the remote display.

7. The method of claim 1, further including:
receiving user input via the local computing device; and
wherein determining the portion of the web page to render for display via the remote display is based, at least in part, upon the user input.

8. An apparatus comprising:
a first renderer configured to render based on characteristics of a first display of the apparatus;
a second renderer configured to render based upon characteristics of a second display of a remote device, the characteristics of the first display being different than the characteristics of the second display;
a processor configured to:
receive a web page in response to a user of the apparatus requesting the web page;
using the first render, control a first rendering including rendering of the web page on the first display;
receive at least one visual presentation characteristic of the second display;
receiving an indication of an action by the user of the local computing device;
in response to the action by the user of the apparatus, determine a portion of the web page to render for display via the second display, and
using the second render, control a second rendering including rendering of the portion of the web page based upon the received at least one visual presentation characteristic of the second display, wherein the portion of the web page is visually the same on the first display and the second display, and
the second rendering is synchronized with the first rendering to display the second rendering on the second display at a same time as the first rendering is displayed on the first display;
generate rendered presentation information based upon the second rendering; and
a network interface configured to transmit the rendered presentation information and the second rendering including the rendered portion of the web page from the apparatus to the remote device.

9. The apparatus of claim 8, wherein the processor is configured to:
reformat the rendered presentation information according to a real-time communications protocol.

10. The apparatus of claim 9, wherein the real-time communications protocol is compliant with Web Real-Time Communication (WebRTC).

11. The apparatus of claim 8, wherein the portion of the web page to render for display includes an audio portion; and
wherein the processor is configured to generate an audio signal based upon at least one characteristic of an audio component of the remote device.

12. The apparatus of claim 8, wherein the processor is configured to:
determine a second portion of the web page to render for display on a local monitor of the apparatus, and
generate a second rendered presentation information based upon rendering the second portion of the web page based upon at least one characteristic of the local monitor; and
further comprising the local monitor configured to display the second rendered presentation information.

13. The apparatus of claim 12, wherein the second portion of the web page to render for display via the local monitor includes the portion of the web page to render for at least display via the remote display.

14. The apparatus of claim 8, wherein the processor is configured to:
receive user input via the apparatus; and
determine the portion of the web page to render for display via the remote display is based, at least in part, upon the user input.

15. A non-transitory computer-readable medium including executable code of a machine-executable program which, when executed, is configured to cause an apparatus including a first renderer and a second renderer to:
receive at the apparatus a web page in response to a user of the apparatus requesting the web page;
first render, by the first renderer, the web page on a display of the apparatus based on at least one first visual presentation characteristic of the display of the apparatus;
receive, at the apparatus, at least one second visual presentation characteristic of a presentation hardware component of a remote apparatus, the at least one first visual presentation characteristic being different than the at least one second visual presentation characteristic;
receiving an indication of an action by the user of the local computing device;
in response to the action by the user of the apparatus, determine, by a processor of the apparatus, a portion of the web page to render for presentation via the presentation hardware component of the remote apparatus;
second render, by the second renderer, the portion of the web page based upon the received at least one second visual presentation characteristic of the presentation hardware component of the remote apparatus, wherein
the portion of the web page is visually the same on the display of the local device and the display of the remote device, and
the second rendering is synchronized with the first rendering to display the second rendering on the display of the remote device at a same time as the first rendering is displayed on the display of the local computing device;
generate, by the processor of the apparatus, rendered presentation information based upon the second rendering; and
transmit the rendered presentation information and the second rendered portion of the web page from the apparatus to the remote apparatus.

* * * * *